(12) United States Patent
Pearson

(10) Patent No.: US 11,486,789 B2
(45) Date of Patent: Nov. 1, 2022

(54) BAG ENGAGING DEVICE

(71) Applicant: TNA Australia Pty Limited, Lidcombe (AU)

(72) Inventor: Brian Joseph Pearson, Lidcombe (AU)

(73) Assignee: TNA Australia Pty Limited, Lidcombe (AU)

( * ) Notice: Subject to any disclaimer, the term of this patent is extended or adjusted under 35 U.S.C. 154(b) by 582 days.

(21) Appl. No.: 16/398,061

(22) Filed: Apr. 29, 2019

(65) Prior Publication Data

US 2019/0331548 A1  Oct. 31, 2019

(30) Foreign Application Priority Data

Apr. 30, 2018 (AU) ................................ 2018901425

(51) Int. Cl.
| | | |
|---|---|---|
| *G01M 3/36* | (2006.01) | |
| *B65H 9/08* | (2006.01) | |
| *B65H 9/10* | (2006.01) | |
| *G01M 3/00* | (2006.01) | |
| *B65H 43/04* | (2006.01) | |
| *B65H 29/00* | (2006.01) | |

(52) U.S. Cl.
CPC ............... *G01M 3/36* (2013.01); *B65H 9/08* (2013.01); *B65H 9/10* (2013.01); *B65H 29/003* (2013.01); *B65H 43/04* (2013.01); *G01M 3/00* (2013.01)

(58) Field of Classification Search
CPC .. G01M 3/36; G01M 3/00; B65H 9/08; B65H 9/10; B65H 29/003; B65H 43/04; B65B 63/022
See application file for complete search history.

(56) References Cited

U.S. PATENT DOCUMENTS

| | | | |
|---|---|---|---|
| 4,148,213 A | 4/1979 | Prakken | |
| 5,507,177 A * | 4/1996 | Focke | G01M 3/36 |
| | | | 73/49.3 |
| 5,542,288 A | 8/1996 | Fenlon | |
| 6,041,646 A | 3/2000 | Fenlon | |

(Continued)

FOREIGN PATENT DOCUMENTS

| | | |
|---|---|---|
| DE | 273 409 A1 | 11/1989 |
| DE | 10 2005 009 918 A1 | 9/2006 |
| EP | 1 186 876 A2 | 3/2002 |

(Continued)

OTHER PUBLICATIONS

Spanish Search Report dated Apr. 30, 2018 in corresponding Spanish Patent Application No. 201930376 (five pages).

(Continued)

*Primary Examiner* — David Z Huang
(74) *Attorney, Agent, or Firm* — Kilpatrick Townsend & Stockton LLP

(57) ABSTRACT

An assembly (10) to engage seemingly closed bags (11) that contain a product. The assembly (10) includes a conveyor (14) that has a length (16) that is moved in a conveying direction (17). A compression device (24) is adjustable in respective distance from the length (17) by a "parallelogram" arrangement. The compression device (24) engages the bags (11) and compresses the bag (11) against the length (12), with sensors (33 and 34) providing a signal indicative of the depth of the bags (11), and therefore a signal indicative of bags (11).

18 Claims, 2 Drawing Sheets

(56) References Cited

U.S. PATENT DOCUMENTS 6,202,476 B1     3/2001   Fenlon
6,427,524 B1*   8/2002   Raspante ............ G01M 3/3218
                                                          73/818

FOREIGN PATENT DOCUMENTS

| EP | 1 344 727 A2 | 9/2003 |
| ES | 2 186 805 T3 | 5/2003 |
| JP | 2006-038458 A | 2/2006 |
| SU | 777572 A1 | 11/1980 |
| WO | 93/07459 A1 | 4/1993 |

OTHER PUBLICATIONS

British Search Report in corresponding British patent application No. GB 1905791.8 (two pages).

* cited by examiner

BAG ENGAGING DEVICE

This application claims priority to Australian Application No. 2018901425, filed Apr. 30, 2018, the disclosure of which is incorporated by reference herein.

FIELD

The present invention relates to the packaging industry, and in particular but not exclusively, to the packaging industry that employs vertical fill and form packaging machines that produce cereal bags.

BACKGROUND

In the packaging industry, vertical fill and form machines are used to produce sealed bags of product. A particular example is the packaging of snack foods.

The bags are formed by the packaging machine, by the packaging machine providing the bag with a longitudinal seal and two transverse seals.

If the seals are not properly formed, the quality of the food contained in the bag degrades. As a particular example, in the manufacture of snack foods, a portion of the snacks being packaged, can be located in the seal, thereby degrading the quality of the seal.

Described in U.S. Pat. Nos. 6,202,476 and 6,041,646, are devices that have the aim of detecting faulty bags, in particular bags that leak.

It is a disadvantage of the above discussed packaging apparatus, that faulty bags can be produced and not be detected. However, a further disadvantage is that their operation is intermittent, and therefore slow.

Further to the above, as bags are being produced by the packaging machines, they are delivered to a conveyor below. The bags may assume a variety of configurations. This has the advantage of making it difficult to arrange the bags for the purposes of being contained within larger bags or boxes.

OBJECT

It is the object of the present invention to overcome or substantially ameliorate at least one of the above disadvantages.

SUMMARY OF INVENTION

There is disclosed herein an assembly to engage closed flexible bags, the assembly including:
 a base;
 a conveyor mounted on the base and having an upstream end and a downstream end between which there moves a conveying length, or the conveyor, that receives and transports the bags towards the downstream end, with the bags resting on the length, said length being moved in a conveyor length from said upstream end to said downstream end; and
 a resilient member mounted above the length and moved in unison in said direction with said length but spaced therefrom so as to engage the bags on the length so as to apply a force thereto, to at least aid in deforming the bags so that the bags delivered to the downstream are at least partly uniform in configuration.

Preferably, said length provides an upwardly facing surface upon which the bags rest.

Preferably, the assembly includes a compression device including said resilient member, with the compression device including at least one loop member that moves in unison with said conveyor, the loop member providing a mounting for said resilient member so that said resilient member moves in unison with said length.

Preferably, said resilient member is a first resilient member, and said assembly includes further resilient members, with the resilient members being spaced along said loop member.

Preferably, each resilient member is an elongated spring extending generally horizontally, and transverse relative to said length.

Preferably, said loop member is a pair of chained loops, the chained loops being spaced with the springs extending therebetween.

Preferably, the springs are longitudinally elongated transverse relative to said conveying direction.

Preferably, said assembly includes a sensor assembly operatively associated with the conveyor and resilient member, to provide a signal indicative of bag volume to thereby enable detection of bags that leak.

There is further disclosed herein an assembly to engage closed bags, the assembly including:
 a base;
 a conveyor mounted on the base and having an upstream end and a downstream end between which there moves a conveying length, of the conveyor, and that receives and transports the bags towards the downstream end, with the bags resting on the length said length being moved in a conveying direction from said upstream end and said downstream end; and
 a resilient member mounted above the conveyor length and move in unison with the conveyor length but spaced therefrom so as to engage the bags on the conveyor length so as to apply a force thereto; and
 a sensor assembly operatively associated with the conveyor and resilient member, to provide a signal indicative of bag volume to thereby enable detection of bags that leak.

Preferably, said sensor assembly includes a first sensor, the sensor operable to detect an upper surface of the bag.

Preferably, said sensor assembly includes a second sensor, the second sensor being spaced from the first sensor in said conveyor direction so that the sensors are spaced along said length, with both sensors being operable to provide a signal indicative of volume of the bag.

Preferably, each sensor detects an upper surface of the bag.

BRIEF DESCRIPTION OF DRAWINGS

Preferred forms of the present invention will now be described by way of example with reference to the accompanying drawings wherein.

DESCRIPTION OF EMBODIMENTS

Figure 1:
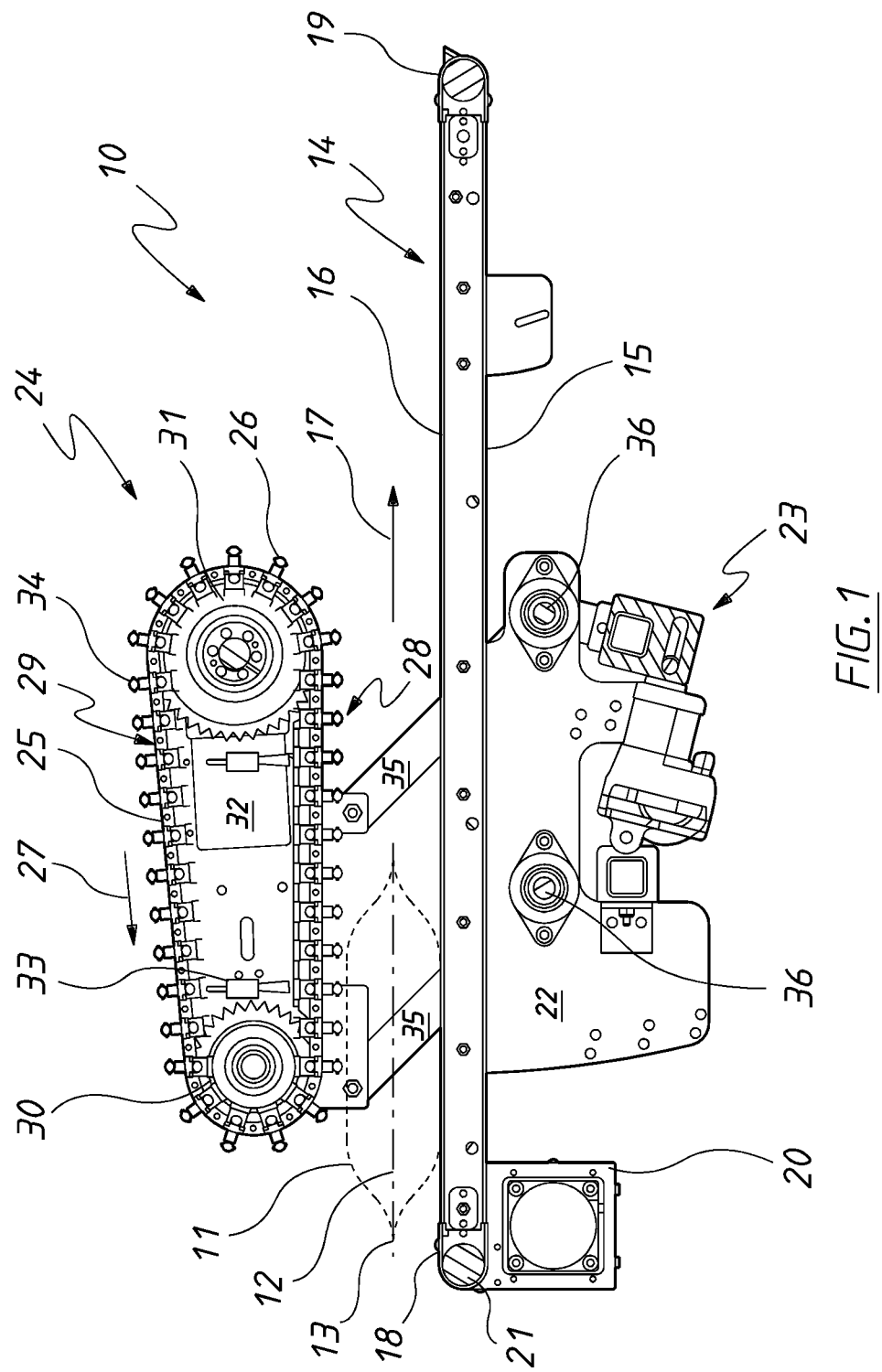
FIG. 1 is a bag engaging assembly, the assembly being sectioned along the line 1-1 of FIG. 2.
Figure 2:
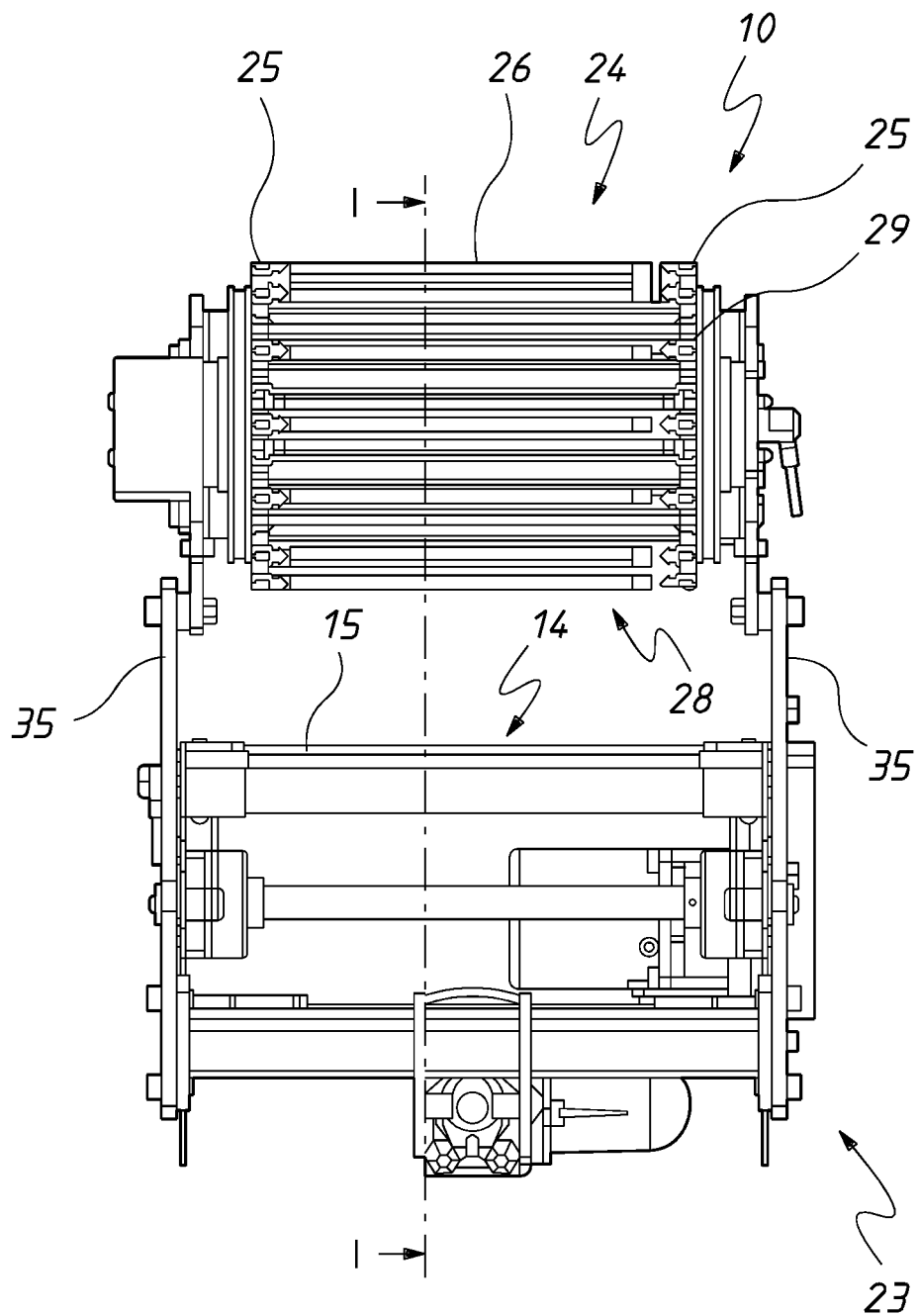
FIG. 2 is a schematic end elevation of the assembly of FIG. 1.

In the accompanying drawings there is schematically illustrated an assembly 10 to engage sealingly closed bags 11 that contain a product. As a particular example, the bag 11 may be a bag containing snack foods. The bag 11 would have a longitudinal seal 12 and end seals 13. Each bag 11 will have a predetermined volume and is sealingly closed.

The assembly 10 includes a conveyor 14. The conveyor 14 includes an endless belt 15 having an upper conveying length 16 that is moved in a conveying direction 17. The length 16 extends generally horizontally between a downstream end 18 and an upstream end 19, with the bags conveyed in the direction 17 to the downstream end 18 from where the bags 11 are delivered from the assembly 10. The bags 11 rest on the length 16, as the length 16 provides an upwardly facing surface.

The conveyor 14 also includes a motor/gear box assembly 20 that drives the conveyor belt 15 in the direction 17 by means of a drive roller 21.

The conveyor 14 includes a base 22 upon which the belt 15 is mounted, while also mounted on the base 22 is a compression device 24. The compression device 24 engages the bags 11 and compresses the bags 11 against the length 16.

The compression device 24 includes a loop member 29 that includes two spaced, parallel chain loops 25 that support, and between which there extends, a plurality of springs (resilient members) 26. The springs 26 extend generally horizontally and transverse of the length 16.

The chain loops 25 are driven in the direction 27 so that the length 28 of the loop member 29 moves in the conveying direction 17 at the same speed as the length 16, so that the lengths 28 and 16 move in unison.

The chain loops 25 pass about an idler sprocket assembly 30 as well as a drive sprocket assembly 31. The drive sprocket assembly 31 includes a motor 32 that is coordinated with the motor 20 so that the lengths 16 and 28 move in unison in the conveying direction 17.

Mounted with the device 24 are two sensors 33 and 34 with the sensor 34 spaced from the sensor 33 in the direction 17 toward the downstream end 18. Each of the sensors 33 and 34 detects the upper surface of the bag 11, so as to provide a signal that is an indication of the depth of the bag 11, and therefore the volume of the bag 11. However the device 24 is operable with a single sensor 33 or 34.

As the bags 11 pass in the direction 17, they are compressed by the springs 36. Accordingly, if there is a leak in the bags 11, the volume of the bag 11 will decrease, so that when the depth of the bag 11 is detected by the sensor 33, a reduced depth will be indicative of a bag 11 that leaks.

When compressing the bags 11, the springs 36 resiliently deform upwardly, and return to their rest position when not engaged with a bag 11.

The sensors 34 communicate with a central computer so as to identify the faulty bags 11 so that they can be removed from the process.

In addition to detecting leaks, the assembly 10 also provides the bags 11 of a more uniform configuration at the downstream end 19. In particular, the springs 26 engage the bags 11 so that the bags 11 assume a more uniform configuration.

The compression device 24 is adjustable in respect of distance from the length 16 by a "parallelogram" arrangement that includes a pair of generally parallel linkages 35. Each of the linkages 35 is pivotally attached to the device 24, and pivotally attached to the base 22, so that the length 28 remains generally parallel to the length 16.

The linkages 35 are attached to drive shafts 36 which are moved angularly about their longitudinal axes by the drive device 23. The drive device 23 would include an electric motor and the gear box assembly, and would be operated to ensure that the length 28 is located at a correct distance from the length 16 to match the size of the bags 11 being conveyed.

The invention claimed is:

1. An assembly to engage closed flexible bags, the assembly including:

a base;

a conveyor mounted on the base and having an upstream end and a downstream end between which there moves a conveying length that receives and transports the bags towards the downstream end, with the bags resting on the conveying length, said conveying length being moved in a conveying direction from said upstream end to said downstream end; and a resilient member mounted above the conveying length and moved in unison in said conveying direction with said conveying length but spaced therefrom so as to engage the bags across a width of each bag, on the conveying length so as to apply a force thereto, to at least aid in deforming the bags so that the bags delivered to the downstream are at least partly uniform in configuration.

2. The assembly of claim 1, wherein said conveying length provides an upwardly facing surface upon which the bags rest.

3. The assembly of claim 2, wherein said assembly includes a sensor assembly operatively associated with the conveyor and resilient member, to provide a signal indicative of bag volume to thereby enable detection of bags that leak.

4. The assembly of claim 1, wherein the assembly includes a compression device including said resilient member, with the compression device including at least one loop member that moves in unison with said conveyor, the loop member providing a mounting for said resilient member so that said resilient member moves in unison with said conveying length.

5. The assembly of claim 4, wherein said resilient member is a first resilient member, and said assembly includes further resilient members, with the resilient members being spaced along said loop member.

6. The assembly of claim 5, wherein each resilient member is an elongated spring extending generally horizontally, and transverse relative to said conveying length.

7. The assembly of claim 6, wherein said loop member is a pair of chained loops, the chained loops being spaced with the springs extending therebetween.

8. The assembly of claim 6, wherein the springs are longitudinally elongated transverse relative to said conveying direction.

9. The assembly of claim 1, wherein said assembly includes a sensor assembly operatively associated with the conveyor and resilient member, to provide a signal indicative of bag volume to thereby enable detection of bags that leak.

10. The assembly of claim 9, wherein the assembly includes a compression device including said resilient member, with the compression device including at least one loop member that moves in unison with said conveyor, the loop member providing a mounting for said resilient member so that said resilient member moves in unison with said conveying length.

11. The assembly of claim 10 wherein, said resilient member is a first resilient member, and said assembly includes further resilient members, with the resilient members being spaced along said loop member.

12. The assembly of claim 11, wherein each resilient member is an elongated spring extending generally horizontally, and transverse relative to said conveying length.

13. The assembly of claim 12, wherein said loop member is a pair of chained loops, the chained loops being spaced with the springs extending therebetween.

14. The assembly of claim 12, wherein the springs are longitudinally elongated transverse relative to said conveying direction.

15. An assembly to engage closed bags, the assembly including:

a base;

a conveyor mounted on the base and having an upstream end and a downstream end between which there moves a conveying length and that receives and transports the bags towards the downstream end, with the bags resting on the conveying length said conveying length being moved in a conveying direction from said upstream end and said downstream end; and a resilient member mounted above the conveying length and moved in unison with the conveying length but spaced therefrom so as to engage the bags across a width of each bag, on the conveying length so as to apply a force thereto and to at least aid in deforming the bags; and a sensor assembly operatively associated with the conveyor and resilient member, to provide a signal indicative of bag volume to thereby enable detection of bags that leak.

16. The assembly of claim 15, wherein said sensor assembly includes a first sensor, the sensor operable to detect an upper surface of the bag.

17. The assembly of claim 16, wherein said sensor assembly includes a second sensor, the second sensor being spaced from the first sensor in said conveyor direction so that the sensors are spaced along said length, with both sensors being operable to provide a signal indicative of volume of the bag.

18. The assembly of claim 17, wherein each sensor detects an upper surface of the bag.

* * * * *